Oct. 20, 1925.  
R. V. FROMMER  
SPORTING GUN  
Filed Aug. 29, 1921  
1,558,158  
3 Sheets-Sheet 1
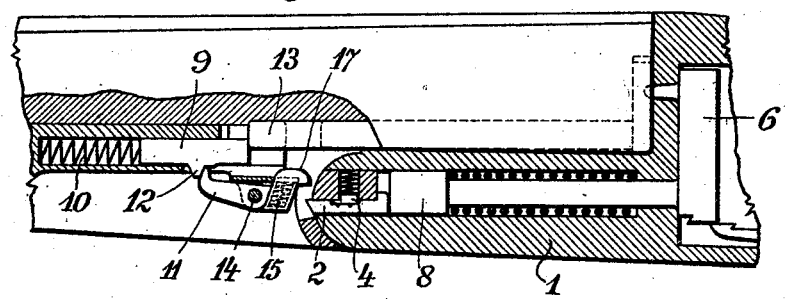
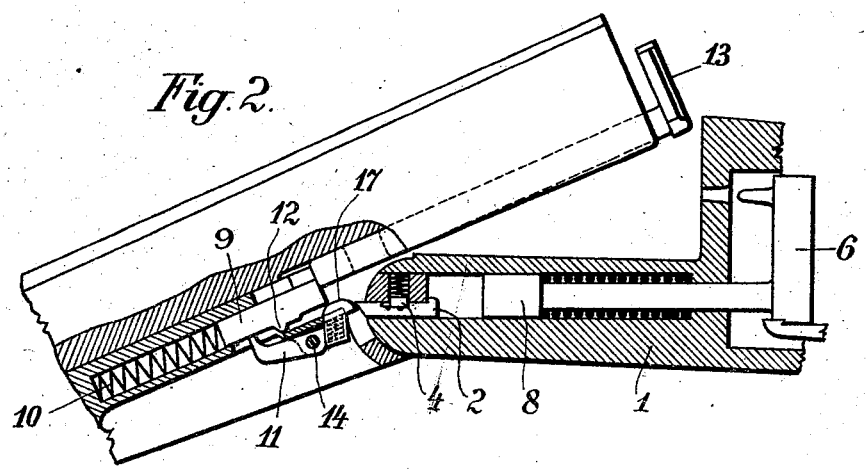
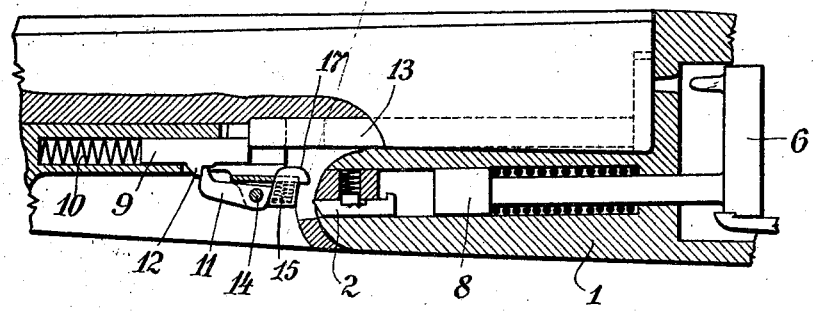
Inventor
R. von Frommer,
By Marks & Clerk
Attys.

Oct. 20, 1925.
R. V. FROMMER
SPORTING GUN
Filed Aug. 29, 1921   3 Sheets-Sheet 2
1,558,158
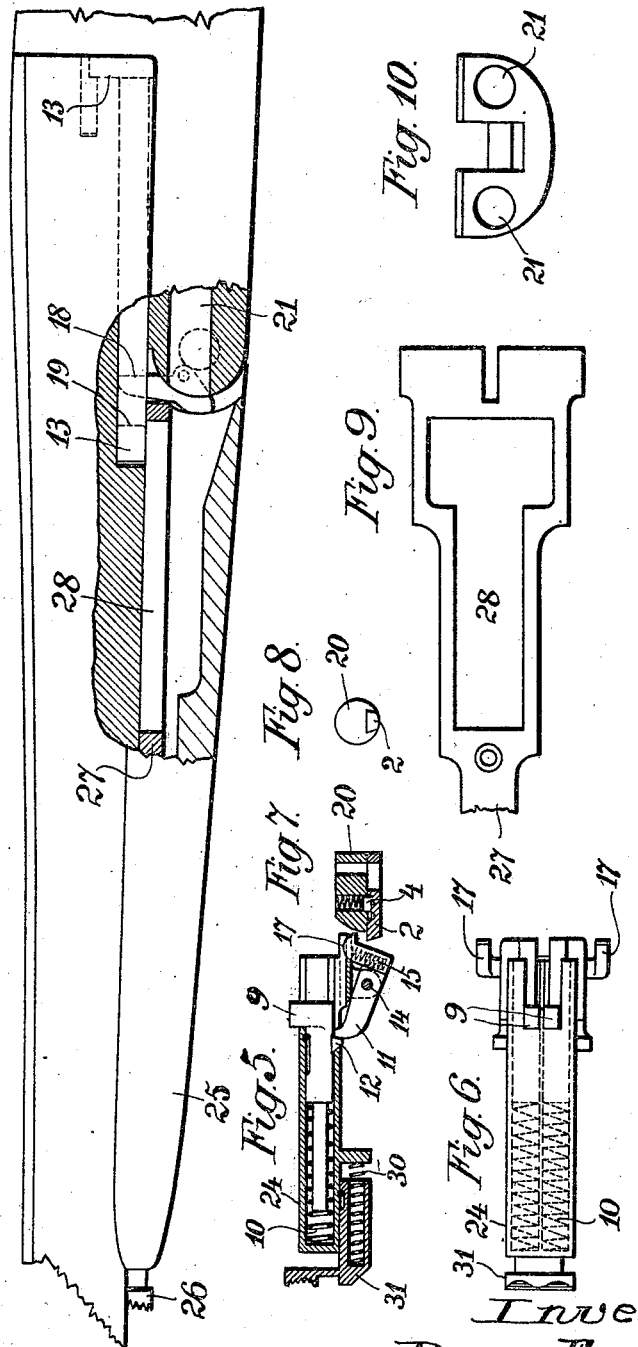
Inventor
R. von Frommer,
By Marks&Clerk
Attys.

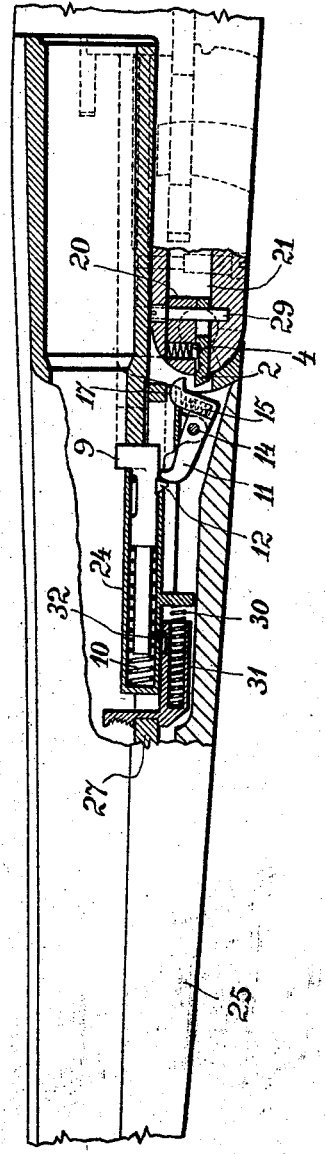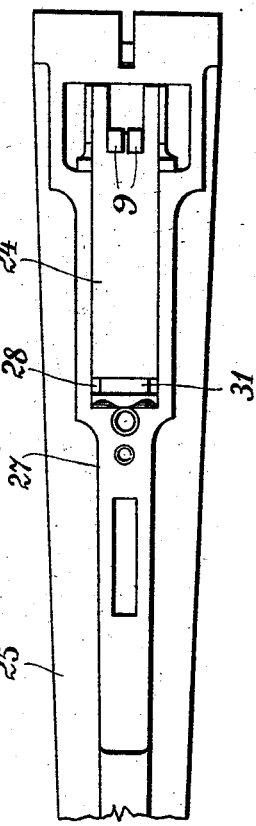

Patented Oct. 20, 1925.

1,558,158

UNITED STATES PATENT OFFICE.

RUDOLF v. FROMMER, OF BUDAPEST, HUNGARY.

SPORTING GUN.

Application filed August 29, 1921. Serial No. 496,377.

*To all whom it may concern:*

Be it known that I, RUDOLF VON FROMMER, a citizen of Hungary, residing at Budapest, in the county of Pest and State of Hungary, have invented certain new and useful Improvements in Sporting Guns, of which the following is a specification.

The invention relates to a sporting gun, provided with cavities for placing therein the automatic cartridge ejector so as to make it possible to fit subsequently the automatic cartridge ejector simply into the weapon. Up to now, when for instance a sporting gun was required with an automatic cartridge ejector, it was necessary to make the automatic cartridge ejector also in the original construction with the other components of the gun, because the subsequent equipment with an automatic cartridge ejector of a sporting gun originally not destined for an automatic cartridge ejector was either impossible, or could be done with essential alterations only on the original gun itself.

As it is well known, an automatic cartridge ejector makes a big increase in the price and so comparatively few huntsmen could afford to buy a gun, equipped with such a device. Most of them had to be satisfied with a gun, without an automatic cartridge ejector without having the prospect later, when again in a position to expend some money on their hunting outfit to add to their accustomed pet gun an automatic cartridge ejector as a last improvement.

By the arrangement, which forms the subject of the present invention, these conditions are improved in such a way, that the gun as well as the cartridge ejector which is to make its supplementing part, are so manufactured, that the gun can come on the market with or without an automatic cartridge ejector and for any eventualities it is provided with cavities into which the automatic cartridge ejector will fit, that is to say in the fore end of stock as well as in the breech body, there are corresponding cavities, furthermore the automatic cartridge ejector according to the present invention is manufactured in such a form, that it can easily and by any body be fitted in or removed from the gun.

According to the essence of the invention this is made possible by fitting the components of the automatic cartridge ejector into groups, that make compact units in themselves and in such form they can be fitted in, or removed from the gun. The automatic cartridge ejector itself can be of many different constructions and it does not form the subject of the present invention.

On the drawings there is a known form of cartridge ejector arrangement represented, without however limiting the present invention to the employement of the same arrangement.

Besides the technical aspects of the present invention, there is evident its great economic or industrial importance. It makes it possible to produce with one manufacturing plant a weapon which can be brought on the market with or without an automatic cartridge ejector, i. e. the production of two types of gun with one manufacturing plant only, for which otherwise two separate plants would have been necessary. Besides it gives the huntsman the chance to improve his gun by gradual expenditure of money.

The ejector device, employed in connection with this invention, is represented on the annexed drawings in an arrangement, that corresponds to the invention. Fig. 1 is a longitudinal section of the gun after it has been fired and is still in a locked condition, with cocked ejector device and with the disengager in active position.

Fig. 2 shows in the open gun the ejector as already thrown forward, with cocked hammer.

Fig. 3 shows the gun as locked, with cocked ejector device, with the disengager pushed back into its inactive position and with the hammer retained in its cocked position.

Fig. 4 is a part sectional side view of the sporting gun, when the ejector is removed.

Fig. 5 is a partly sectional view of the removed striking piece and the retaining component and Fig. 6 is the top plan view of the same.

Fig. 7 is a sectional view of the removed releaser and

Fig. 8 is a front view as seen from the left side of Fig. 7.

Fig. 9 is the top plan view of a part of the bolting guide, that is in the fore end of stock, while Fig. 10 is a front view of the lower part of the breech body.

Fig. 11 is a view of the sporting gun, corresponding to Fig. 4 with the ejector fitted in and Fig. 12 is a top plan view of the fore end of stock as it is removed from the gun and with the ejector fitted in.

The cartridge extractor 13 will be hurled back in the well known manner when opening the gun by the striking piece 9, which is effected by the spring 10, with such a force, that the cartridge extractor will eject the shell from the chamber. For this purpose the striking piece 9 will be retained in its forward pressed position (Figs. 1 and 3) in which it presses the spring 10 together by the retaining lever 11, which is pivoted on pin 14, because the lever 11 places itself in front of the nose 12 of the striking piece (Figs. 1 and 3). Thus for ejecting the cartridge shell, only the retaining lever 11 must be swung around the pin 14, to release the striking piece 9. For this end the lever 11, which is pressed by the spring 15 into its locking position, is provided at its rear end with a nose 17. Upon the tilting movement of the barrel the nose 17 is pushed against the tooth at the fore end of the disengaging slide 2 when the last mentioned is in its forward position as shown by Figs. 1 and 2. Thus, when tilting the barrel, the lever 11 swings on its pin 14 and releases the nose 12 of the striking piece 9. In consequence thereof spring 10 throws the striking piece and thus the cartridge extractor instantly back, and thus the cartridge shell is thrown out of the barrel.

When tilting back the barrel, the cartridge extractor 13 will be pushed back by the breech body of the gun in the known way, thus pressing back the striking piece 9 so that the spring 10 will be tensioned. Furthermore, through the nose 17 of the cocking lever 11 also, the disengaging slide 2 is pressed back a little (Fig. 3) so, that the latter gets into its inactive position. The two positions of the disengager 2 will be determined by the springbolt 4 in such a way that the latter snaps into the notches of the slide 2, which correspond to the two positions.

For the purpose that the disengager 2 may be pressed again into its active position at the firing of each cartridge, it will be so effected at its rear end by the head 8 of the guiding stem of the hammer 6, that when firing the gun the head 8 presses the disengager 2 forward into its active position (Fig. 1).

Of course, this ejector arrangement can be employed for two barrelled guns as well as for single barrel guns. As the ejector arrangement is provided only for the purpose of throwing out the spent cartridges, it is a matter of course, that for each barrel a separate ejector, and also a separate cartridge extractor must be provided.

An unspent cartridge will not be pulled out of the barrel by the cartridge extractor 13,—which has the usual form,—exactly the same way as with the usual guns, without an automatic ejector, because the disengager for the barrel, in which there is an unspent cartridge, remains in its pushed back position and thus does not swing the cocking lever 11 when opening the gun, and in consequence the striking piece 9 will be also retained.

When tilting the barrel, the cartridge extractor 13 pushes the cartridge shell back by the aid of a thumb 18, arranged at the end of the fore part of stock, even if the automatic ejector is in operation. By this means the spent cartridge in the chamber will be loosened and the effect of the automatic ejector upon the shell will be augmented. The disengager 2, the cocking lever 11 and the cut away part 19 of the cartridge extractor 13 are so arranged, that the thumb 18 does not prevent the working of the striking piece 9 and the cartridge extractor 13, in operating the automatic ejector.

As it can be seen from Figures 4–10, according to the essence of the invention, on the one hand the disengager 2 is fitted with its spring bolt into the body 20 and the former as a compact whole can be put in or taken out of the bore 21 of the breech body of the gun. (With double barrelled guns there are, of course, two such disengager elements required, which can be placed into the two bores 21 of the breech body, Fig. 10.)

For fixing the above said component group in the breech body, there is the threaded bolt 29. The striking pieces 9 with their springs 10 and the cocking lever 11 are also fitted as a compact group, being arranged on a special frame 24 which can be fixed upon a corresponding part of the gun. With the constructional form, represented in the drawing, in the guiding plate 27—which is arranged for fixing the fore end of stock to the barrel—there is a slot 28 arranged, into which the frame 24 fitted with its elements, can be put in or taken out as a compact unit.

This will be done preferably on that side of the fore end of stock, which touches with the barrel or the barrels of the gun. This is the way to protect this component group against outer influences and dirt and to make it of easy access after dismounting the fore part of stock from the barrels, for fitting in or removing from the fore part of stock. The fixing of this component group in the fore end of stock will be done by the bolt 31, which is under the effect of the spring 30 and its motion is limited by the pin 32.

What I claim as new and desire to secure by Letters Patent is as follows:

1. In a sporting gun of the pivoted barrel type, a shell extractor, means for forcing the extractor rearwardly of the barrel each time the barrel is swung about its pivot to open the rear end of the barrel, a unitary automatic ejector mechanism detachably associated with the barrel and adapted to forcibly move the extractor rearwardly when the barrel is swung about its pivot in one direction, and hand actuated means for locking the ejector mechanism in position, said hand actuated means permitting the operator to instantaneously attach or detach the ejector mechanism to or from the gun.

2. A sporting gun of the pivoted barrel type including a shell extractor, means for moving the extractor rearwardly of the barrel when the barrel is swung in one direction about its pivot, a fore-stock associated with the barrel and provided with a cavity, a slotted member associated with the fore-stock, a movable abutment mounted on the gun, a unitary automatic ejector mechanism extending into said slot and cavity and engageable with the extractor, said ejector mechanism including a trigger adapted to engage said abutment for releasing the ejector mechanism when the barrel is swung about its pivot in one direction, and hand actuated means for locking the ejector mechanism in the fore-stock, said hand actuated mechanism permitting the operator to instantaneously attach the ejector mechanism to or detach ejector mechanism from said fore-stock.

3. In a sporting gun of the pivoted barrel type, a fore-stock and a breech provided with cavities, a shell extractor associated with the barrel of the gun, means for gradually moving the shell extractor rearwardly when the barrel is moved about its pivot in one direction, a movable abutment mounted in the cavity of the breech, a frame arranged in the fore-stock cavity, a hand controlled spring-pressed bolt for locking said frame in the fore-stock, a spring-pressed plunger mounted in the frame and engageable with said extractor for operating the latter with a jerk when the plunger is released, a trigger mounted on said frame for normally holding the plunger in a position in which its spring is compressed, and a nose on the trigger adapted to strike said abutment when the barrel is swung in one direction for releasing the trigger.

4. A sporting gun of the pivoted barrel type including a breech, and a fore-stock and barrel pivotally mounted on the breech, said fore-stock being provided with a cavity, an abutment member detachably connected to the breech, a frame mounted in said cavity, a hand-controlled spring-pressed bolt for latching the frame in the cavity, a spring-pressed plunger mounted on the frame, a shell extractor arranged on the barrel and adapted to be forcibly thrown rearwardly by said plunger, a nose on the plunger, a spring pressed trigger mounted on said frame and normally engaging the nose to prevent the plunger from moving rearwardly, and an extension on the trigger adapted to engage said abutment when the barrel is moved in one direction about its pivot for causing the trigger to actuate and release the plunger.

In testimony whereof I affix my signature.

RUDOLF v. FROMMER.